UNITED STATES PATENT OFFICE.

PAUL JOCHUM, OF OTTWEILER, PRUSSIA, GERMANY.

PROCESS OF MAKING ARTIFICIAL STONE.

SPECIFICATION forming part of Letters Patent No. 404,199, dated May 28, 1889.

Application filed January 4, 1889. Serial No. 295,416. (No specimens.)

*To all whom it may concern:*

Be it known that I, PAUL JOCHUM, of Ottweiler, in the Kingdom of Prussia and Empire of Germany, have invented certain new and useful Improvements in the Process of Making Artificial Stone, of which the following is a specification.

This invention relates to an improved process of making artificial stone or so-called "iron stone," which is intended for pavements of all kinds, roadways, and the like, as it is of great hardness and durability and capable of resisting wear to a great extent; and the invention consists of a process of making artificial stone according to the following steps: First, mixing pulverized red clay or red-clay slate containing iron with an emulsion formed of a saturated solution of sulphate of iron or other metallic sulphate and finely-ground iron ore; secondly, shaping and drying the mass; thirdly, immersing the same in an emulsion of water, sulphate of iron, pulverized manganese, and pulverized iron, and, lastly and finally, burning the bricks thus obtained in a suitable kiln.

In carrying out my invention common red clay containing iron or red-clay slate rich in iron is ground fine by means of edge rollers or disintegrators, and instead of being mixed with water it is mixed with an emulsion composed of a saturated solution of sulphate of iron or other metallic sulphate and finely-ground iron ore as rich in iron as possible, using, by preference, caput mortuum, which ingredients are thorougly incorporated by stirring. Two or more clays of different degrees of fatness and of great binding power may also be mixed together after being finely ground in such proportions that a uniform degree of shrinkage of the mass takes place. The clays employed must have as large a percentage of iron as possible. The mixing of the clays with the emulsion takes place in a mixing or pugging mill, preferably according to the following proportions: For ten thousand kilograms of iron stone to be produced a corresponding quantity of clay containing iron is used, while the emulsion is prepared from one hundred kilograms of finely-pulverized iron ore, thirty to thirty-two kilograms of sulphate of iron, and two thousand five hundred liters of water.

When the clay compound has been mixed with the emulsion, as described, the same is cut up into blocks or bricks which have a leather-like color and consistency and which are subjected to pressure and dried. After they are dried and before they are placed in the kiln they are immersed into a second emulsion, which is composed of twelve kilograms of sulphate of iron, sixteen kilograms of pulverized iron ore or caput mortuum, one-quarter of a liter of pulverized manganese, and one hundred liters of water. After the stone blocks or bricks of suitable size are saturated to a certain depth by the second emulsion they are burned in a kiln of suitable construction. When cooled off, the blocks have the appearance, hardness, and sound of cast-iron, and are of great durability, being specially applicable to all kinds of paving purposes.

Having thus described my invention, I claim as new and desire to secure by Letters Patent—

The process herein described of making artificial stone, which consists in mixing pulverized clays containing iron clays with an emulsion composed of a saturated solution of sulphate of iron and finely-ground iron ore; secondly, shaping the mass into blocks and drying the same; thirdly, immersing the same in a second emulsion formed of a saturated solution of sulphate of iron, pulverized iron ore, and manganese, and, lastly, burning the blocks, substantially as set forth.

In testimony that I claim the foregoing as my invention I have signed my name in presence of two subscribing witnesses.

PAUL JOCHUM.

Witnesses:
ALVESTO S. HOGUE,
JEAN GRUND.